United States Patent [19]
Bonnet

[11] Patent Number: 5,462,400
[45] Date of Patent: Oct. 31, 1995

[54] METHOD AND APPARATUS FOR MECHANICAL LOADING AND UNLOADING

[75] Inventor: Henri Bonnet, Atlanta, Ga.

[73] Assignee: United Parcel Service of America, Inc., Atlanta, Ga.

[21] Appl. No.: 184,853

[22] Filed: Jan. 21, 1994

Related U.S. Application Data

[63] Continuation of Ser. No. 795,882, Nov. 21, 1991, abandoned.

[51] Int. Cl.⁶ .................................................... B65G 59/02
[52] U.S. Cl. .......................... 414/796.5; 414/903; 414/786; 198/785
[58] Field of Search ........................... 414/796.5, 786

[56] References Cited

U.S. PATENT DOCUMENTS

| | | | |
|---|---|---|---|
| T998,009 | 9/1980 | Bevan | 414/797.2 |
| 1,659,873 | 2/1928 | Hodge | 198/785 |
| 2,634,870 | 4/1953 | Barnum . | |
| 2,960,243 | 11/1960 | Beaulieu | 414/903 |
| 3,017,041 | 1/1962 | Hawkes et al. | 414/903 |
| 3,103,284 | 10/1963 | Hawkes | 414/796 |
| 3,211,301 | 10/1965 | Welhouse | 414/796 |
| 3,715,043 | 2/1973 | Weir . | |
| 3,779,404 | 12/1973 | McWilliams . | |
| 3,827,585 | 8/1974 | McWilliams . | |
| 3,836,021 | 9/1974 | McWilliams . | |
| 4,281,955 | 8/1981 | McWilliams | 414/398 |
| 4,315,705 | 2/1982 | Flint . | |
| 4,425,069 | 1/1984 | Saur et al. | 414/398 |
| 4,453,874 | 6/1984 | Veldhuizen et al. | 414/797.3 |
| 4,701,091 | 10/1987 | Yamauchi et al. . | |
| 4,813,839 | 3/1989 | Compton | 414/345 |
| 5,238,350 | 8/1993 | Krieg et al. | 414/278 |

FOREIGN PATENT DOCUMENTS

| | | |
|---|---|---|
| 0321680 | 6/1989 | European Pat. Off. . |
| 0451592 | 10/1991 | European Pat. Off. . |
| 2070004 | 9/1971 | France . |
| 2318089 | 2/1977 | France . |
| 0243410 | 9/1990 | Japan ..................... 198/785 |

*Primary Examiner*—Michael S. Huppert
*Assistant Examiner*—Gregory A. Morse
*Attorney, Agent, or Firm*—Daniel H. Golub; R. Anthony Diehl

[57] ABSTRACT

An insertable pallet for unloading or acquiring objects or for loading or piling objects, particularly in a stacked position, comprising at least one live roller for moving an object being unloaded or loaded along the insertable pallet. In the unloading mode of the insertable pallet, the insertable pallet is thrust at an object seam until the insertable pallet is underneath the object being unloaded a sufficient distance to engage at least one live roller of said insertable pallet for moving the object from its initial position along said pallet. In the loading mode of the insertable pallet, an object being loaded is moved to and preferably partially over the front of the insertable pallet by at least one live roller. The insertable pallet is appropriately positioned so that when the object arrives at the front of the insertable pallet an operator can nudge the object off the insertable pallet with a minimum of physical effort.

12 Claims, 4 Drawing Sheets

5,462,400

METHOD AND APPARATUS FOR MECHANICAL LOADING AND UNLOADING

This is a continuation of application Ser. No. 07/795,882 filed on Nov. 21, 1991, now abandoned.

FIELD OF THE INVENTION

This invention relates to an apparatus for handling objects, and, in particular, to an apparatus for handling stackable objects.

STATEMENT OF THE RELATED ART

Packages or parcels being shipped or transported frequently require loading or unloading during the transportation process. For example, during the shipment process parcels are typically loaded onto and unloaded from trailers and other storage or transportation media. Such parcels are often nonuniform in size and weight and must be stored in stacked arrangements. In the known art, unloading of such objects is usually done manually by persons taking the objects from a trailer or other container and placing them on a conveyor belt. Likewise, much loading is performed by persons taking packages or objects from a conveyor and stacking them in a trailer or other storage area. Such use of conveyors to assist in the manual handling of objects is taught by U.S. Pat. No. 4,425,069, issued to Saur et al., U.S. Pat. No. 4,281,955, issued to McWilliams, U.S. Pat. No. 3,389,690, issued to Jerome and U.S. Pat. No. 2,634,870, issued to Barnum.

Various attempts have been made to automate the loading and unloading of trailers. For example, there have been trailers with moveable floors which function as conveyors depositing an entire load of packages or objects at the trailer end. However, these devices are not suitable for applications involving fragile packages or objects. Items of this type were damaged during unloading. Trailers made to function like dump trucks proved similarly unworkable.

In order to provide damage free loading and unloading of delicate objects, it is generally believed that objects or groups of objects must be treated as individual units. Such operations therefore typically involve a substantial amount of manual labor. Due to factors such as limited reach, limited speed and limited strength, persons performing manual loading and unloading often prove to be a limiting factor during such operations. Thus, parcel transportation companies have limited the weight of packages which can be transported due to the physical limitations of their manual laborers. Manual unloading is further complicated by difficulty in dislodging and acquiring objects or packages which have been stored or transported in a stacked configuration, because it is often difficult to get fingers or knuckles between close objects or packages for gripping.

Several attempts at automated package handling are known in the prior art. For example, U.S. Pat. No. 3,827,585, issued to McWilliams, shows a conveyor assembly adapted for the loading of mail bags into highway trailers. In the assembly taught by McWilliams, mail bags are conveyed single file by conveyers and are propelled from of the conveyor frame discharge end to strike the trailer end wall and drop between the end wall and a baffle member which dams the bags against any substantial rebound. This process is repeated in the rearward direction to fully load the trailer. U.S. Pat. No. 3,779,404, also issued to McWilliams, shows a similar system for propelling bags over a conveyor discharge end. The use of conveyors systems which dump objects during loading operations is also taught by U.S. Pat. No. 4,813,839, issued to Compton, and U.S. Pat. No. 4,701,091, issued to Yamauchi. These systems, which drop or dump objects off a conveyor to load them, suffer from the aforementioned drawback that they cannot be used to handle relatively delicate objects or packages without causing damage thereto.

In view of the drawbacks associated with manual loading and unloading of objects or packages, it is a principal object of the present invention to eliminate physical exertion from loading and unloading operations.

In view of the drawbacks associated with automated loading and unloading of relatively delicate objects or packages, it is an object of the present invention to provide an automated means for moving such objects or packages without causing damage thereto.

Another object of the present invention is to provide means for acquiring or dislodging objects or packages, particularly where such objects have been stored in a stacked position.

An additional object of the present invention is to provide a new and improved pallet for stacking objects received by a conveyor, which pallet can be manipulated to accomplish the stacking and loading of such objects.

Further objects and advantages of the invention will become apparent from the description of the invention which follows.

SUMMARY OF THE INVENTION

The present invention is directed to an insertable pallet for unloading or acquiring objects or for loading or piling objects, particularly in a stacked position, having at least one live roller for moving an object being unloaded or loaded along the insertable pallet. In the unloading mode of the insertable pallet, the insertable pallet is thrust at a seam between objects until the insertable pallet is underneath the object being unloaded. The insertable pallet is thrust underneath the object a sufficient distance for the object to engage at least one live roller of the insertable pallet for moving the object from its initial position along the pallet. In the loading mode of the insertable pallet, an object being loaded from the pallet onto a stack is moved over the front of the insertable pallet by at least one live roller. The insertable pallet is positioned so as to permit an operator to nudge the object off the insertable pallet with a minimum of physical effort when the object arrives at the front of the insertable pallet.

DETAILED DESCRIPTION OF THE INVENTION

Figure 1:
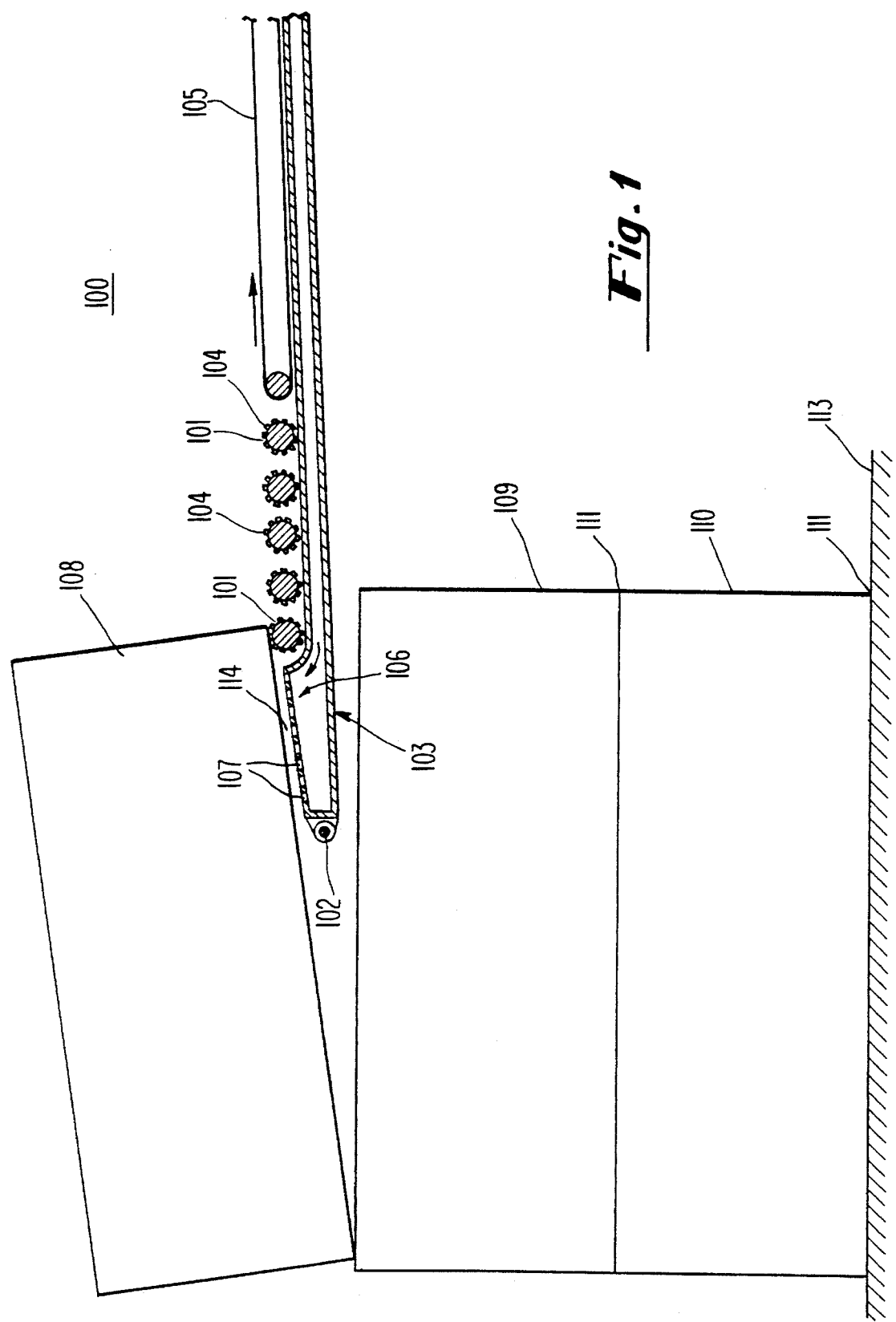
FIG. 1 is a cross-sectional view of an insertable pallet in accordance with the present invention.

Referring now to FIG. 1, there is shown a cross-sectional view of a preferred embodiment of an insertable pallet, generally designated 100, for performing mechanized unloading and loading of stackable objects 108, 109, 110 in accordance with the present invention. Stackable objects 108, 109, 110 may be packages or parcels which must be unloaded from a trailer or other storage location. Insertable pallet 100 is provided with live rollers 101 for loading and unloading stackable object 108 when insertable pallet 100 is positioned beneath stackable object 108. Live rollers 101 are preferably provided with gripping splines 104 or are otherwise grooved to facilitate the gripping of stackable object 108 by live rollers 101 during either the unloading or loading mode of insertable pallet 100.

Front portion 103 of insertable pallet 100 extends substantially from the front edge of insertable pallet 100 to front-most live roller 101. In the unloading mode of insertable pallet 100, front portion 103 is thrust at a selected insertion seam 111. Insertion seams 111 indicate a separation between two stackable objects 108, 109, 110, or between object 110 and floor 113. Thus, insertion seams 111 separate the bottom of object 109 from the top of object 110 and the bottom of object 110 from floor 113. When insertable pallet 100 is wedged into insertion seam 111 between, for example, objects 108, 109, the thrusting motion of pallet 100 is continued until front portion 103 is entirely inserted underneath object 108. In order to facilitate this insertion or wedging into seam 111, insertable pallet 100 is wedge shaped and may have at least one positioning roller 102 disposed at its front edge. Once insertion of insertable pallet 100 is complete to the point where stackable object 108 is in contact with front-most live roller 101, stackable object 108 is drawn onto insertable pallet 100 by one or more live rollers 101. As stackable object 108 is drawn farther onto insertable pallet 100 additional live rollers 101 are brought into contact with stackable object 108. The additional live rollers 101 assist in carrying object 108 onto conveyor 105. Once on conveyor 105, object 108 may be transported away for processing.

In the loading mode of insertable pallet 100, live rollers 101 and conveyor 105 rotate in the opposite direction to that in which they turn in the unloading mode. In the loading mode, insertable pallet 100 is positioned to stack or dispose stackable objects 108, 109, 110 which are delivered to insertable pallet 100 by way of conveyor 105. From conveyor 105, stackable objects 108, 109, 110 are carried by live rollers 101 onto and possibly partially over front portion 103 of pallet 100. Preferably, insertable pallet 100 is positioned so that after stackable objects 108, 109, 110 pass over live rollers 101, an operator can easily nudge objects 108, 109, 110 over front portion 103 thereby placing objects 108, 109, 110 in their required resting locations with a minimum of physical effort.

The interior of insertable pallet 100 may be provided with air chamber 106 for propelling air through openings 107 provided through the top of air chamber 106. Air propelled through air openings 107 generates air cushion 114 or air table 114 between insertable pallet 100 and stackable object 108. Air cushion 114 reduces frictional forces between insertable pallet 100 and stackable object 108 when object 108 is drawn along during loading or unloading operations.

Figure 2:
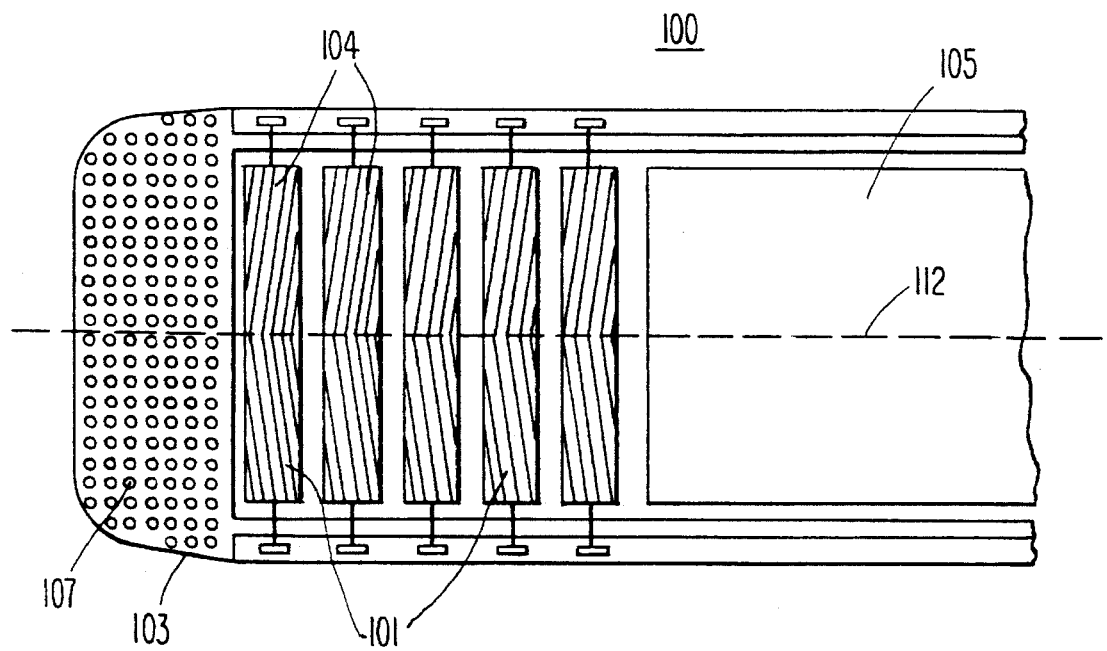
FIG. 2 is a cut away plan view of a portion of the insertable pallet of FIG. 1.

Referring now to FIG. 2, there is shown a plan view of a portion of an insertable pallet 100 in accordance with the present invention, wherein live rollers 101 are provided with gripping splines 104. In the preferred embodiment of pallet 100, gripping splines 104 are formed in a spiral shape and are generally symmetric about midspan 112 of live rollers 101. This spiral design of gripping splines 104 tends to center objects 108, 109, 110 along midspan 112 of live rollers 101a–e as objects 108, 109, 110 proceed over insertable pallet 100. In the preferred embodiment of insertable pallet 100, front portion 103 is rounded at its corners to facilitate the insertion of pallet 100 into seams 111 and to facilitate general movement of pallet 100 underneath packages 108, 109, 110. Additionally, since pallet 100 may be wedge shaped, live rollers 101 may progressively widen in diameter with front-most live roller 101 having the smallest diameter and rear-most live roller 101 having the largest diameter. In an alternative embodiment, a live conveyor (not shown) may be substituted for live rollers 101 within insertable pallet 100.

Figure 3:
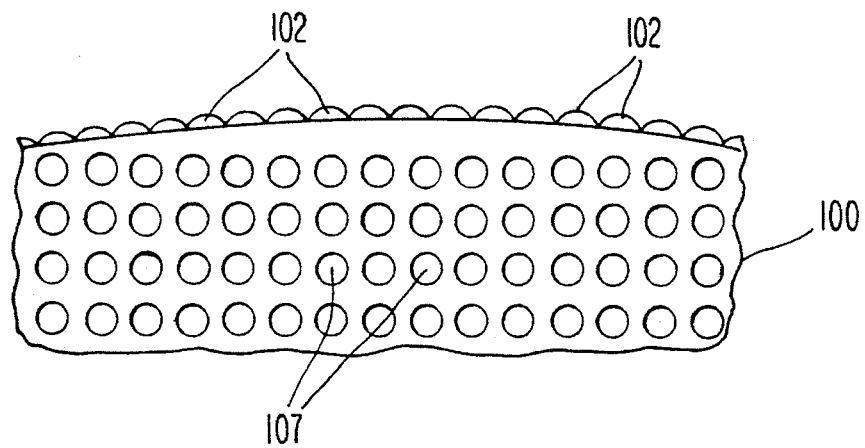
FIG. 3 is an expanded plan view showing further detail of the insertable pallet of FIG. 1.

Referring now to FIG. 3, there is shown an expanded plan view of an insertable pallet 100 according to the present invention having a plurality of positioning rollers 102. Positioning rollers 102 act to facilitate the insertion of pallet 100 at a package seam. The need for precise alignment between insertable pallet 100 and package seam 111 is lessened by positioning rollers 102 which allow objects 108, 109, 110 being acquired to move more freely about the front edge of insertable pallet 100.

In a further alternative embodiment of insertable pallet 100 (not shown), air openings 107 are oriented in the direction of motion of objects 108, 109, 110 at a forty-five degree angle with respect to the top surface of front portion 103 thereby imparting a force vector to assist the movement of objects 108, 109, 110. It will be understood that objects 108, 109, 110 move along insertable pallet 100 in opposite directions depending on whether pallet 100 is operating in the loading mode or the unloading mode. Thus, pallet 100 may be adapted for either loading or unloading by selected angular orienting of air openings 107 to impart a force vector to objects 108, 109, 110 in the direction of their motion.

Figure 4:
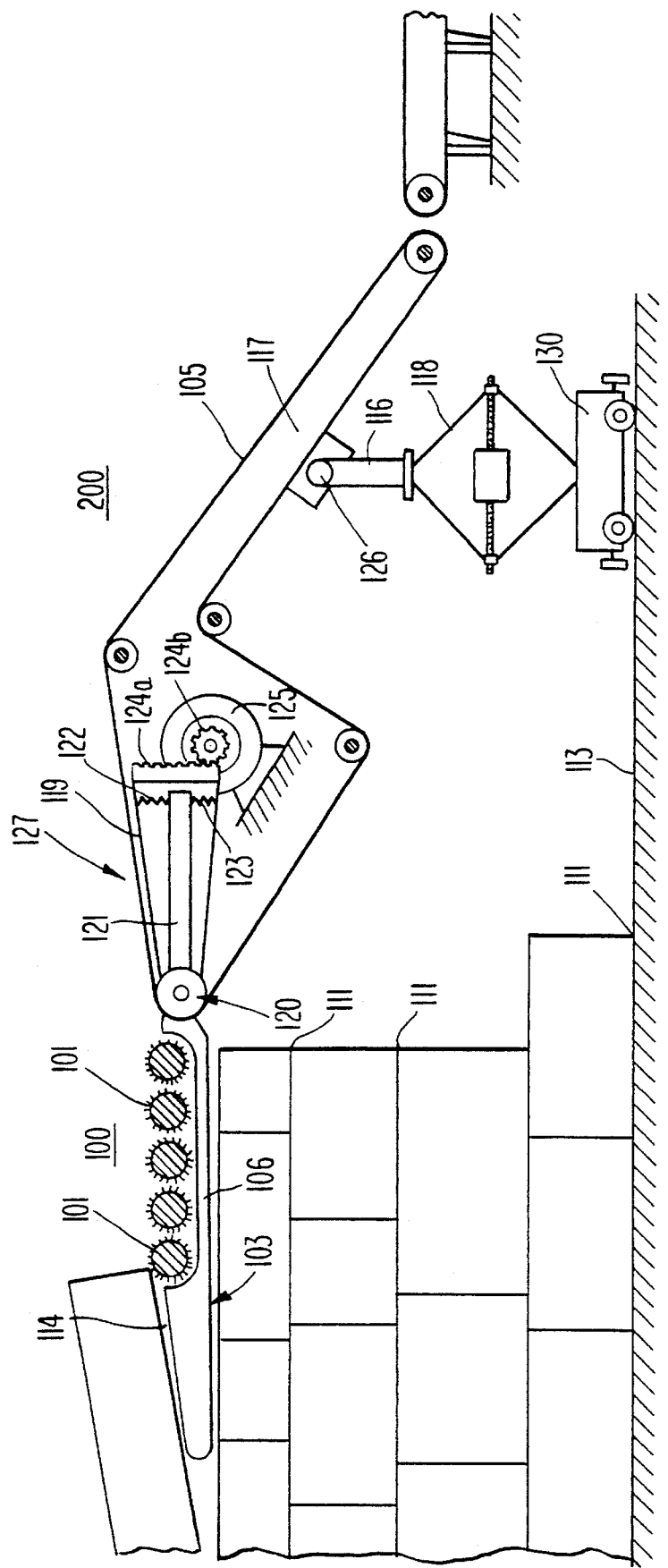
FIG. 4 is cross-sectional view of a leveling mechanism for leveling the insertable pallet of FIG. 1.

Referring now to FIG. 4, there is shown a cross-sectional view of loading and unloading system 200 having leveling mechanism 127 for positioning and leveling insertable pallet 100 of the present invention. Support member 116 of leveling mechanism 127, for controlling the vertical and horizontal motion of insertable pallet 100, is pivotally connected to arm 117 at pivot connection 126 and rigidly secured at its other end to motorized vertical jack 118. Motorized vertical jack 118 is secured on carrying device 130 for controlling the horizontal position of insertable pallet 100 with respect to floor 113.

Levelling frame 119 for maintaining insertable pallet 100 in a generally level orientation is pivotally mounted at one end to insertable pallet 100 at pivot joint 120. Levelling frame 119 is coupled at its opposite end to gearmotor 125. Teeth 124a disposed upon leveling frame 119, are sized to match and engage corresponding teeth 124b disposed upon leveling gearmotor 125. In response to vertical movement of motorized vertical jack 118, leveling gearmotor 125 rotates a corresponding amount to maintain insertable pallet 100 in a generally level orientation. Lever 121 of insertable pallet 100 is flexibly coupled to levelling frame 119 by offsetting loaded springs 122, 123. Springs 122, 123 resiliently assist in maintaining insertable pallet 100 level in a non-rigid manner to allow pallet 100 to swivel slightly about joint 120. This freedom to swivel facilitates the adjustment of pallet 100 during its insertion at insertion seams 111 as well as during loading operations.

Figure 5:
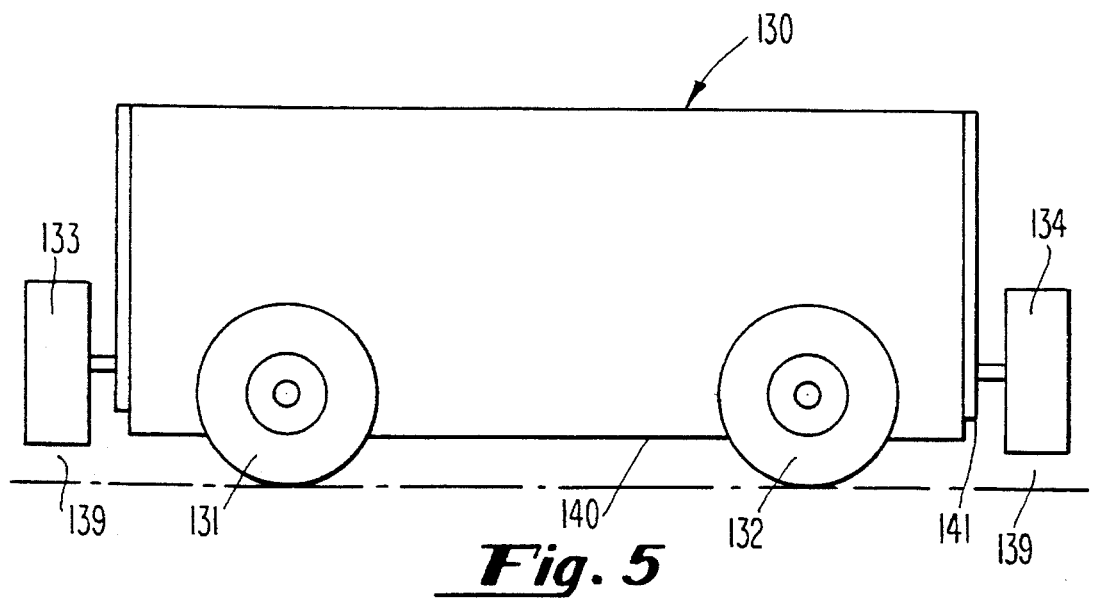
FIG. 5 is a side view of a carrying device for supporting and shifting the position of the insertable pallet of FIG. 1.

FIG. 5 shows a side view of a carrying device 130 for shifting the position of insertable pallet 100 in accordance with the present invention. Carrying device 130 has eight wheels 131, 132, 133, 134 and 135–138 (not shown) for controlling the position of carrying device 130, two wheels for each of the four vertical sides of carrying device 130. Wheels 131, 132, 135, 136 are rotatably mounted to a first plate 140 and wheels 133, 134, 137, 138 are rotatably mounted to a second plate 141. A gear motor and chain drive mechanism (not shown) is provided for driving device 130. First plate 140 and second plate 141 remain separated by a small gap during operation of carrying device 130 so that only four wheels engage the ground at any given time. Thus, when wheels 131, 132, 135, 136 are on the ground, wheels 133, 134, 137, 138 remain separated from the ground by a small gap 139. Likewise, when wheels 131, 132, 135, 136 are raised, wheels 133, 134, 137, 138 come in contact with the ground. By manipulating the orientation between first plate 140 and second plate 141, two sets of wheels can be selectively engaged to translate carrying device 130 in each of four directions.

Figure 6:
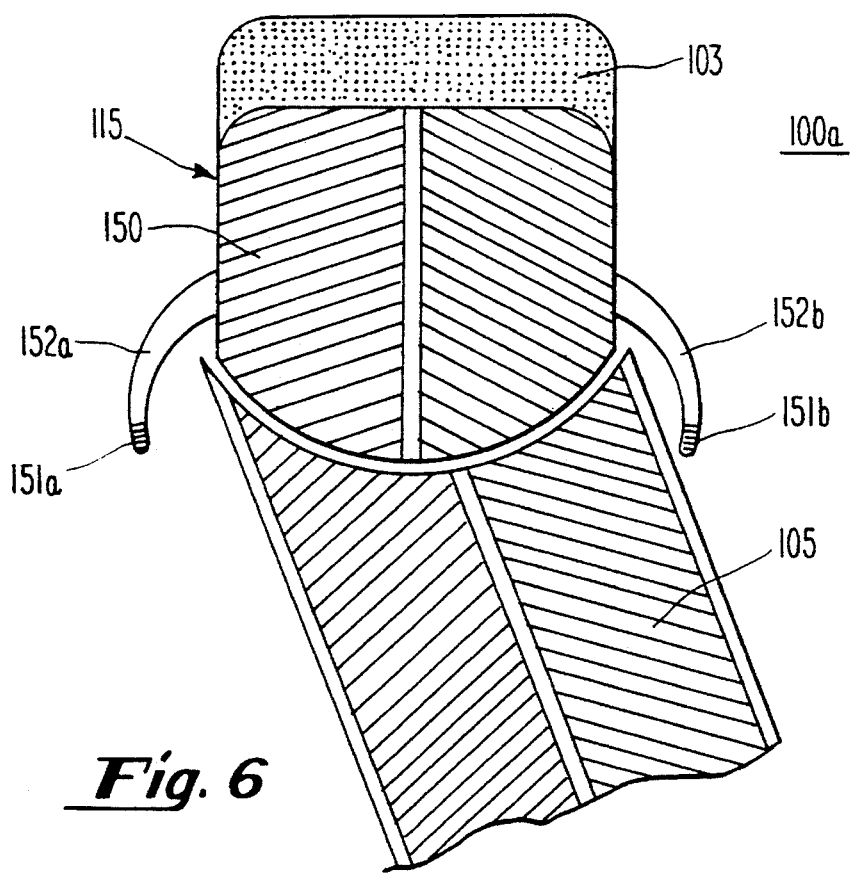
FIG. 6 is a plan view showing angular rotation of an alternate embodiment of the insertable pallet of FIG. 1.

FIG. 6 is a plan view of insertable pallet 100a. Insertable pallet 100a is an alternate embodiment of insertable pallet 100. Front assembly 115 of insertable pallet 100a is provided with live conveyer 150 for gripping and moving objects 108, 109, 110 when objects 108, 109, 110 are disposed upon insertable pallet 100a. Front assembly 115 of insertable pallet 100a and conveyor 105 are pivotally coupled to each other in order to permit rotation of front assembly 115 with respect to conveyor 105 and easy insertion of front portion 103 underneath object 108.

Connected to insertable pallet 100a by manipulation arms 152a, b are manipulator grips 151a, b for controlling the motion and position of insertable pallet 100. By moving or working manipulator grips 151a, b an operator may electronically direct the thrusting and positioning insertable pallet 100. Optical sensors or scanners (not shown) may be used to assist manipulator grips 151a, b in locating insertion seams 111. Additionally, sensors or scanners (not shown) may be used to limit the range of motion of insertable pallet 100 so that, for example, when operating inside a trailer or other closed space, insertable pallet 100 may be prevented from reaching or bumping the trailer walls or ceiling.

The present invention may be embodied in other specific forms without departing from the spirit or essential attributes of the invention. Accordingly, reference should be made to the appended claims, rather than the foregoing specification, as indicating the scope of the invention.

What is claimed is:

1. An apparatus for handling a plurality of irregularly stacked packages comprising an insertable pallet, said insertable pallet having vertically translatable wedge means for acquiring a first of said stacked packages by thrusting a leading edge of said wedge means at a substantially horizontal seam between said first package and a second package to separate said first and second packages by simultaneously applying upward force against a lower surface of said first package and downward force against an upper surface of said second package until said lower surface of said first package is brought into contact with live roller means for moving said first package along said pallet, said wedge means supporting said live roller means only in a region set back from said leading edge.

2. The apparatus of claim 1, wherein said insertable pallet comprises at least one free positioning roller for facilitating insertion of said insertable pallet under said first package.

3. The apparatus of claim 1, wherein said live roller means comprises splined roller means for gripping said first package.

4. The apparatus of claim 3, wherein said splined roller means are oriented to center said first package on said insertable pallet.

5. The apparatus of claim 1, wherein said insertable pallet comprises means for directing air against said first package.

6. The apparatus of claim 5, wherein said means for directing air are oriented to impart a force vector to said first package in the direction of motion of said first package.

7. The apparatus of claim 1, further comprising leveling means for maintaining said insertable pallet in a generally level orientation.

8. The apparatus of claim 7, further comprising resilient spring means, said insertable pallet being resiliently coupled to said leveling means by said resilient spring means, said resilient spring means being adapted to bias said insertable pallet in said level orientation.

9. The apparatus of claim 1, further comprising carrying means for positioning said insertable pallet.

10. A method for handling a plurality of irregularly stacked packages, comprising the steps of:
    (a) vertically translating an insertable pallet in a substantially horizontal plane intersecting a seam between a first of said irregularly stacked packages and a second of said irregularly stacked packages and inserting said pallet underneath said first package;
    (b) providing wedge means disposed at a leading edge of said insertable pallet;
    (c) providing advancing means within said insertable pallet, said advancing means being disposed in a region of said wedge means set back from said leading edge;
    (d) thrusting said wedge means into said seam between said first and second packages until a lower surface of said first package is brought into contact with said advancing means; and,
    (e) advancing said first package along said insertable pallet by said advancing means.

11. The method of claim 10, further comprising the step of centering said first package on said insertable pallet.

12. The method of claim 10, further comprising the step of providing a cushion of air between said first package and said insertable pallet, wherein said cushion of air imparts a force vector to said first package in the desired direction of motion of said first package.

* * * * *